United States Patent
La Rosa et al.

(10) Patent No.: US 7,051,714 B2
(45) Date of Patent: May 30, 2006

(54) INJECTION CONTROL METHOD FOR AN INTERNAL COMBUSTION ENGINE, IN PARTICULAR A DIESEL ENGINE, AND CORRESPONDING CONTROL SYSTEM

(75) Inventors: Manuela La Rosa, Giarre (IT); Felice Esposito-Corcione, Marigaliano (IT); Giuseppe Esposito-Corcione, Marigliano (IT); Mario Lavorgna, Bacoli (IT); Bruno Sgammato, Pomigliano D'Arco (IT); Davide Platania, Sant'Agata Li Battiati (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 289 days.

(21) Appl. No.: 10/272,478

(22) Filed: Oct. 15, 2002

(65) Prior Publication Data

US 2003/0116138 A1    Jun. 26, 2003

(30) Foreign Application Priority Data

Oct. 15, 2001    (EP) .................................. 01830645

(51) Int. Cl.
 *F02M 1/00*    (2006.01)
(52) U.S. Cl. ...................................... 123/446; 123/480
(58) Field of Classification Search ................ 123/480, 123/446, 478, 501, 502; 701/103, 104, 105, 701/114
See application file for complete search history.

(56) References Cited

U.S. PATENT DOCUMENTS

| | | | | |
|---|---|---|---|---|
| 5,056,026 A | | 10/1991 | Mitchell et al. | ........ 364/431.03 |
| 5,091,858 A | | 2/1992 | Paielli | .................... 364/431.12 |
| 5,231,962 A | * | 8/1993 | Osuka et al. | ................ 123/299 |
| 6,378,487 B1 | * | 4/2002 | Zukouski et al. | ............ 123/299 |
| 6,705,277 B1 | * | 3/2004 | McGee | ......................... 123/299 |
| 2002/0108602 A1 | * | 8/2002 | Carroll et al. | .............. 123/456 |
| 2002/0157646 A1 | * | 10/2002 | Hiraku et al. | ................ 123/456 |
| 2004/0000289 A1 | * | 1/2004 | Seo et al. | ..................... 123/447 |

FOREIGN PATENT DOCUMENTS

| | | |
|---|---|---|
| DE | 196 39 172 A1 | 4/1998 |
| EP | 0 894 965 A1 | 2/1999 |
| EP | 1 035 314 A2 | 9/2000 |

* cited by examiner

*Primary Examiner*—John T. Kwon
(74) *Attorney, Agent, or Firm*—Lisa K. Jorgenson; Robert Iannucci; SEED IP Law Group PLLC

(57) ABSTRACT

An injection control method for controlling a "common rail" fuel injection system in a diesel engine is described. The method includes the following steps: an initializing step for acquiring engine control parameters; and a main adjustment cycle for adjusting operational variables of the engine. The injection control method also includes an interrupting step for adjusting an injection procedure proper of the injection system by variation of all the characteristic parameters of the injection procedure. Also described is an injection control system for a diesel engine based on the above method.

15 Claims, 5 Drawing Sheets

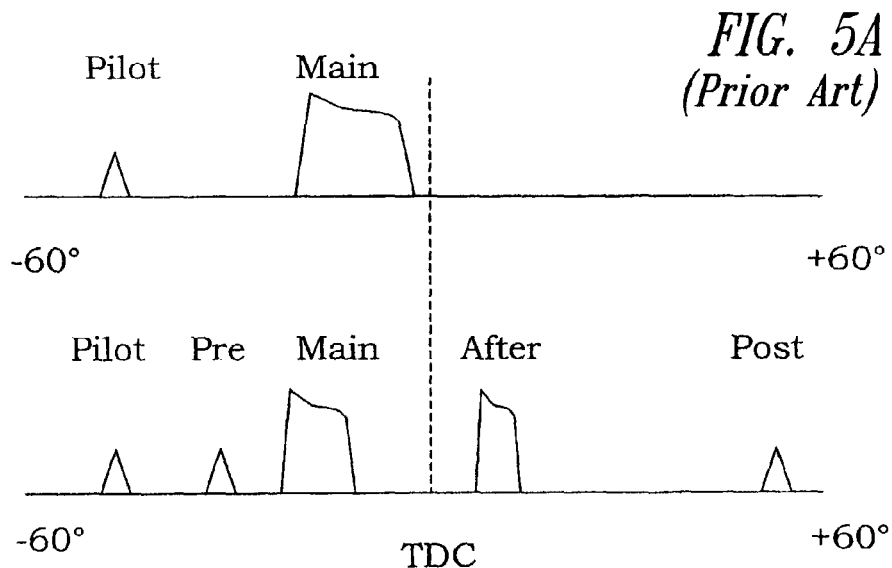
FIG. 5A
(Prior Art)
FIG. 5B
(Prior Art)
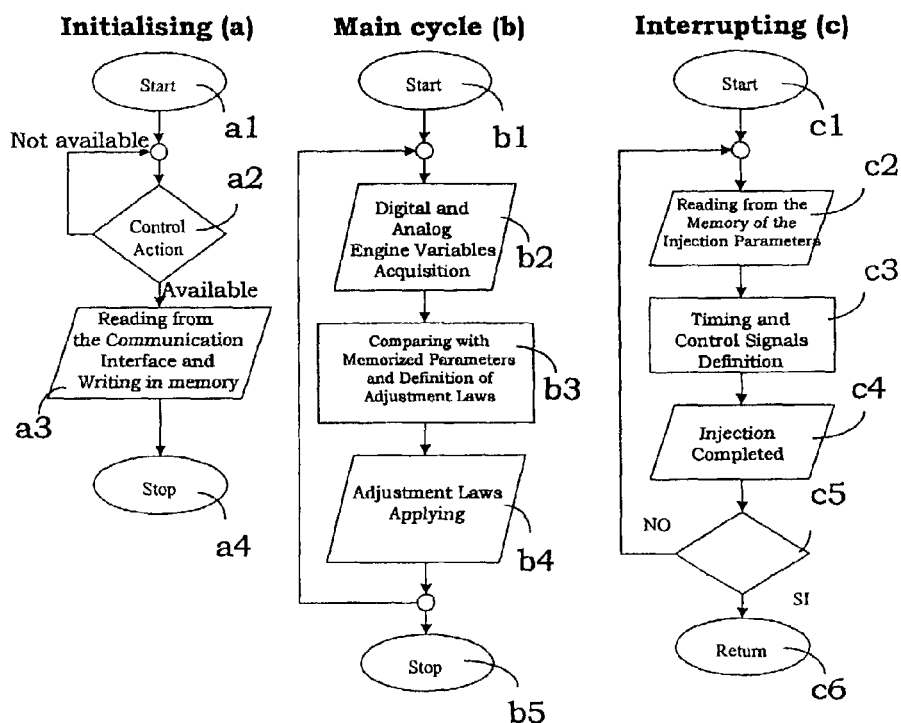
FIG. 6

INJECTION CONTROL METHOD FOR AN INTERNAL COMBUSTION ENGINE, IN PARTICULAR A DIESEL ENGINE, AND CORRESPONDING CONTROL SYSTEM

BACKGROUND OF THE INVENTION

1. Field of the Invention

The present invention relates to an injection control method and system for internal combustion engines, in particular Diesel engines.

The invention specifically relates to an injection control method for controlling a CR (Common Rail) fuel injection system in a Diesel engine.

The invention relates, particularly but not exclusively, to an injection control method and system for a direct injection Diesel engine, and the following description will make reference to this application for convenience of illustration only.

2. Description of the Related Art

As it is well known, the strict restrictions on the emissions and fuel usage in internal combustion engines enacted by the European Union for application by the year 2005, along with the latest technological developments of fuel injection systems, have focused the attention of the automobile industry on the optimization of the engine fuel injection process.

At the same time, the market of Diesel-powered cars has increased from 20 to 35%, the expansion being ascribable to the superior thermodynamic efficiency of Diesel engines compared to gasoline engines, in the face of a potential for pollution that is still fairly high.

This favorable trend to the Diesel engine opens new prospects for research on fuel injection systems, fuel injection being the only input of this type of engines that can be manipulated.

Another requisite is observance of the limits enforced by standing European regulations (EURO IV and V), schematically shown in FIG. 1.

Accordingly, the Diesel engine industry is thoroughly investigating the operation of fuel injection systems, including injectors, in order to find out a flexible solution that can cope with statutory limitations.

The study of fuel injection systems must take account of that variations in the number of injections per working cycle substantially modify the percentages of polluting matter. Also the changes in percentage are of opposite signs for some substances: for example, carbon monoxide CO drastically decreases as the number of injections increases, whereas "white smoke" or hydrocarbons HC increases with the number of injections, as it is shown in FIG. 2.

FIG. 2 is a comparative graph of the percentages of combustion noise (A), specific consumption (B), emissions of nitrogen oxides $NO_x$(C), hydrocarbons HC (E), carbon monoxide CO (F), and particulate (D) under the following conditions of operation:

one pilot injection (Pilot) and one main injection (Main);
one initial injection (Pre) and one main injection (Main);
one initial injection (Pre), one main injection (Main), and a later injection (After); and
one initial injection (Pre), a first main injection (Main1) at 50%, and a second main injection (Main2) at 50%.

It should be noted that the pilot injection and pre-injection are pulse injections, whereas the main injections last longer.

It should be further considered that fuel injection systems are presently used to serve high performance engines as made available on a large scale by recent developments in the Diesel field. These high performance engines use less fuel and exhibit much reduced carbon monoxide $CO_2$, gaseous and particulate emission values.

A comparison of the "old" indirect injection Diesel engine (IDI engine) with the "new" direct injection engine (DI engine) can help to illustrate the development.

The basic difference between an IDI engine, schematically shown at 1 in FIG. 3, and a DI engine is in the injection pressure of the injection system and in the manner of producing and burning the fuel/air mixture.

The engine 1, specifically its engine cylinder 2, includes a small swirl chamber 5 in the cylinder head 3 of the cylinder 2, which opens to the main combustion chamber placed in the head 7 of the piston 9 through a passage having suitable dimensions. The swirl chamber 5 is connected to an injector 4 and a glow plug 6. Also shown in FIG. 3 is a valve 8.

The function of the swirl chamber 5 is the one of optimizing the formation of the fuel/air mix and of the following combustion to be completed in the cylinder 2.

This combustion mode is at least 15% less efficient than that to be obtained by injecting the fuel directly into the cylinder as it is done in ID engines of recent manufacture.

IDI engines show, in fact, higher load and thermal losses through the mix transfer and combustion areas compared to ID engines.

The combustion process in a Diesel engine is typically heterogeneous, in the sense that fuel and air are not mixed together before combustion but are only contacted after the air temperature has been raised (about 500° to 600° C.) by compression in the cylinder to ignite the mix.

Until recently, the direct injection of fuel, which constitutes a significant step forward, was impracticable especially in "light-duty" engines which are conceived for higher rotational speeds than standard truck engines, because of engineering and operating problems, such as noise emission and rugged power output.

To improve on these limitations and make direct fuel injection a practical proposition, pumps and electronic control arrangements have been developed that afford higher injection pressures.

In particular a so-called "common rail" (CR) injection control system, schematically shown in FIG. 4, has been recently introduced. The CR system allows to reach enough high injection pressures such to obtain the fuel spraying in the combustion chamber, that results in a near-perfect fuel/air mix.

A CR injection system basically comprises a high-pressure radial-piston feed pump, a rail, a set of injectors connected to the high-pressure pipe, a control unit, actuators, and a plurality of sensors. The pump maintains the fuel under a high pressure and delivers it into the rail that serves all the injectors and essentially acts as a reservoir. Part of the fuel is then injected into the combustion chamber by the injectors receiving an electromagnetic command, and the rest of the fuel is returned to the fuel tank to be recycled.

The circulating fuel flow is established and monitored by sensors connected to an electronic control unit, where the pressure recorded by the sensors is compared with predetermined values and thus overpressure is driven by returning the exceeding fuel to the tank. The information from the sensors enables the control unit to adjust the amount of fuel to be injected according to the engine load and RPM, thereby providing for highly flexible management.

The pressure so produced meets the engine requirements at all ranges, unlike traditional systems where the pump was linked to the engine operation such that the pressure depended on the engine RPM and was never at optimum levels, especially at low speeds.

Further, in fast diesel engines, as light duty diesels are, mixing time must be the shortest as possible in order to ensure the engine desired performances. The innovative aspect of the CR system is that high pressures (up to 1600 bar) can be produced independently of the engine speed, so that the right amount of fuel is delivered for optimum fuel/air mixing and combustion under all conditions.

In engines already in the field and those still in the laboratory stage, the CR system is controlled by pre-set mapping. In practice, a pressure sensor mounted in the rail senses a voltage signal between 0 and 5 Volts and sends it to the control unit, where the engine operation maps (or matrices) are implemented.

Particularly in the operation maps, a duty cycle of the pressure regulator placed in the high-pressure pump corresponds to each voltage value.

Thus, when the rail pressure sensor senses the required pressure to meet a load variation and the control unit maps the appropriate duty cycle to produce that pressure (the value of the duty cycle being a function of the engine RPM), the system settles, ensuring that the injection occurs correctly.

A limitation to conventional injection control systems comes inherently from their operating method, wherein the duty cycle of the pressure regulator is set according to fixed maps. It is evident that such maps cannot account for transients and mechanical variations due to an ageing engine.

Also, the electronic control unit will decide on the duration of the injection (and, therefore, the fuel flow rate) according to the load demand once the optimum pressure is established, and with it the torques and power outputs of the engine for that speed.

It is recalled that currently available CR systems only effect two injections (the Pilot and Main injections) per cycle. However, more recent studies have led to new generation systems effecting five injections per cycle (called the Pilot, Pre, Main, After and Post injections). FIGS. 5A and 5B schematically show the injections for traditional (FIG. 5A) and new generation (FIG. 5B) systems.

BRIEF SUMMARY OF THE INVENTION

An embodiment of this invention provides a fuel injection control system which is based on a more "flexible" injection control method than those currently in use.

The method comprises the following steps:

a. an initializing step for acquiring control parameters of said engine;

b. a main adjustment cycle for adjusting operational variables which are typical of said engine; and c. an interrupting step for adjusting an injection procedure of said injection system by varying all the characteristic parameters of said injection procedure.

The injection control method is of the programmable type, which can be used either at the testing stage, or can be integrated to existing engine control systems.

In particular, all the characteristic injection parameters can be varied by the injection control method of this invention.

The features and advantages of the injection control method and system according to the invention will be apparent from the following detailed description of embodiments thereof, given by way of non-limitative examples with reference to the accompanying drawings.

BRIEF DESCRIPTION OF THE SEVERAL VIEWS OF THE DRAWINGS

In the drawings:

FIGS. 5A and 5B schematically show the injections effected in traditional CR systems and new generation CR systems according to the prior art;

FIG. 6 shows flow charts for the injection control method of an embodiment of this invention;

DETAILED DESCRIPTION OF THE INVENTION

Figure 1:
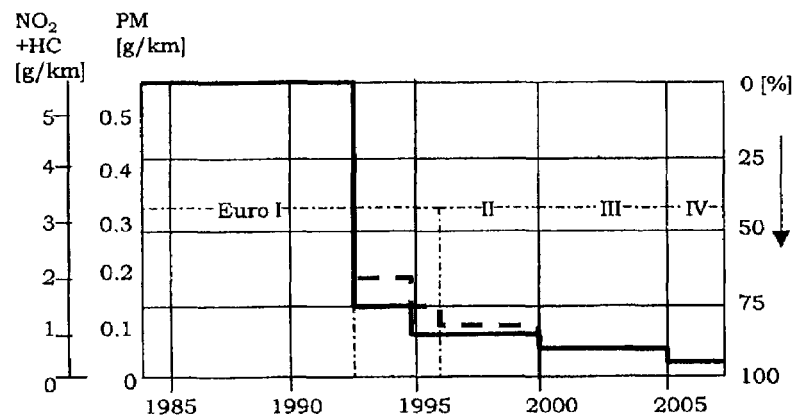
FIG. 1 schematically shows the restrictions on internal combustion engine emissions enforced by European regulations.
Figure 2:
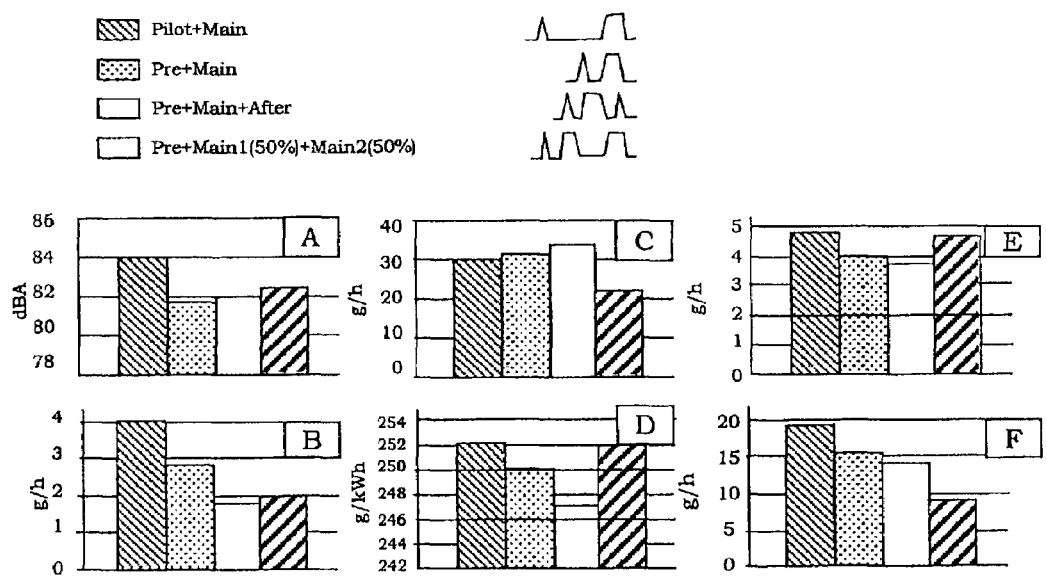
FIG. 2 schematically shows the percent variations in noise emission, specific fuel consumption, and gas and particulate emissions occurring in a direct injection Diesel engine as the number of injections changes.
Figure 3:
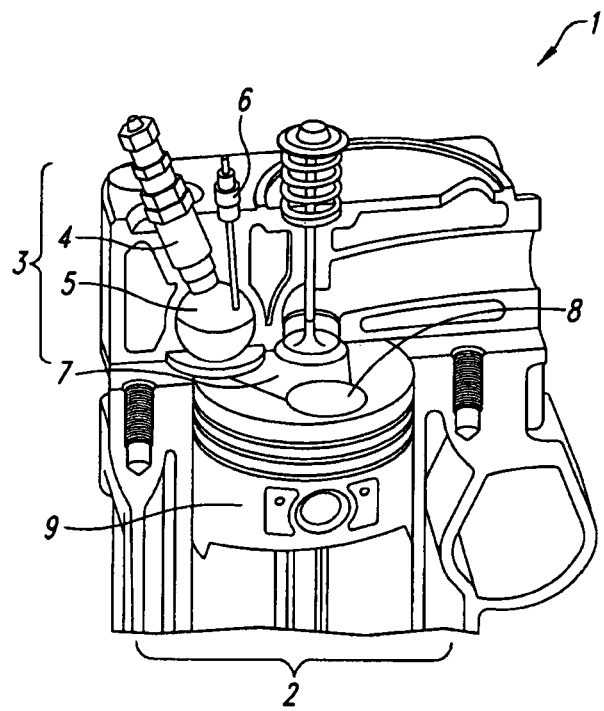
FIG. 3 schematically shows a detail view of a direct fuel injection (IDI) engine according to the prior art.
Figure 4:
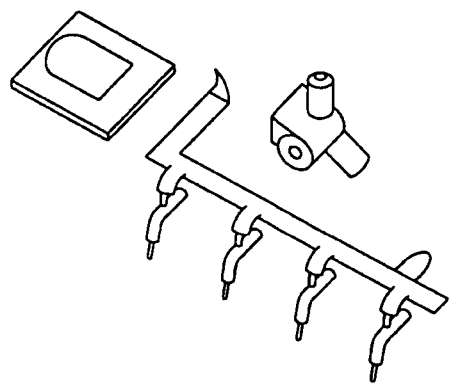
FIG. 4 schematically shows a common rail (CR) type of fuel injection system according to the prior art.

An injection control method specifically intended for a direct injection Diesel engine will be described with reference to the drawings, in particular to FIG. 6 thereof.

The injection control method of one embodiment of this invention comprises the following main steps:

a. an initializing step to acquire operating parameters of the engine;

b. a main engine variable adjusting cycle;

c. an interrupting step to adjust the fuel injection proper.

The process flow of the fuel injection control method according to the invention will now be described with reference to the main steps outlined above.

(a) Initializing Step

This step follows resetting of the injection control system that implements the method of this invention. The sequence of steps that comprises the initializing step awaits control parameters from a communication interface, and stands by until they become available (for example, until the start bit of the serial communication comes up according to the RS232 standard.).

As the control parameters become available, the injection control method acquires all the parameters from the communication interface and stores them at appropriate memory locations to make them available to the main control cycle that follows.

In particular, the initializing step comprises the following steps:

a1. starting the procedure (Start);

a2. checking the control parameters for availability (Control Action) in a feedback loop that will repeat this checking step until the control parameters are available;

a3. upon the control parameters becoming available, reading the control parameters from the Communication Interface and storing them at appropriate memory locations of the system; and a4. interrupting the procedure (Stop).

The control parameters acquired are information covering all the references of the engine variables for real time control, as well as the fuel injection profile parameters, to be implemented in the various conditions of speed (such as RPM, throttle control angle, etc.).

(b) Main Cycle

This is the gist of the injection control method. The main cycle is interrupted only by a reset signal of the injection control system, as manually produced in an emergency situation or due to malfunction (watchdog reset).

During this step, the method cyclically acquires all the engine analog and digital parameters, and compares them with the references received during the initializing step.

The results of this comparison are control actions for adjusting individual variables, no parameters being presumed to be fixed.

The main cycle comprises the following steps:

b1. starting the procedure (Start);

b2. acquiring the engine variables (corresponding to either digital or analog values);

b3. comparing the values of the engine variables acquired with the parameter values stored during the initializing step, and defining corresponding adjustment laws for application to the engine;

b4. applying the engine adjustment laws defined during the previous step (b3), and returning to the engine variable acquiring step (b2); and b5. interrupting the procedure (Stop).

Particularly and advantageously, the main cycle will adjust the engine variables that have been set at initialization, but will not act on the fuel injection itself. Fuel injection is managed by the interrupt step (c) that is synchronized with a triggering signal (Start of Injection) that is active once the engine cycle is synchronized with the reference set in terms of lead and/or lag before/after TDC (Top Dead Centre) during the engine compression phase.

(c) Interrupt Step (Injection Start)

During the engine compression phase, as the shaft reaches a starting angle set by the user, the system electronics generates an interrupt signal. The response routine to the interrupt signal will, based on the injection map entered during the initializing step, control the injector drivers by setting the number of injections, the durations of peak and hold currents, and the intervals between injections.

On completion of the last injection, the interrupt step is ended and Main Cycle resumed.

In particular, the interrupt step comprises the following steps:

c1. starting the procedure (Start);

c2. reading the fuel injection control parameters from the memory;

c3. timing the injections and the corresponding control signals;

c4. driving the power drivers that are able to effect the pre-set injections, by means of the above control signals (c3); and c5. checking the injection for completion; if the injection is not complete, returning to the read step (c2), otherwise c6. interrupting the procedure and returning to Main Cycle (Return).

The injection control method is based on a strategy of DI engine control that is aimed at meeting the ever stricter European regulations on engine emissions while retaining the performance level of current systems and providing for substantially improved drivability.

Advantageously, all injection types can be employed as the injection pressure varies and the injection strategies are scanned in a condition that is unrelated to RPM and the maps customarily provided in conventional engine control systems.

In particular, the injection control method allows all the characteristic parameters of fuel injection to be varied, namely:

Pressure

Number of injections

Intervals between injections

Duration of each injection

Timing to the TDC

Injection profile

Amplitude and duration of the peak currents at each injection

Amplitude and duration of the hold currents at each injection

Rate of injections per cycle

Summarizing, the injection control method t promotes a flexible injection policy by allowing a thorough study of how fuel injection profile, engine emissions, and engine performance, interact.

Figure 7:
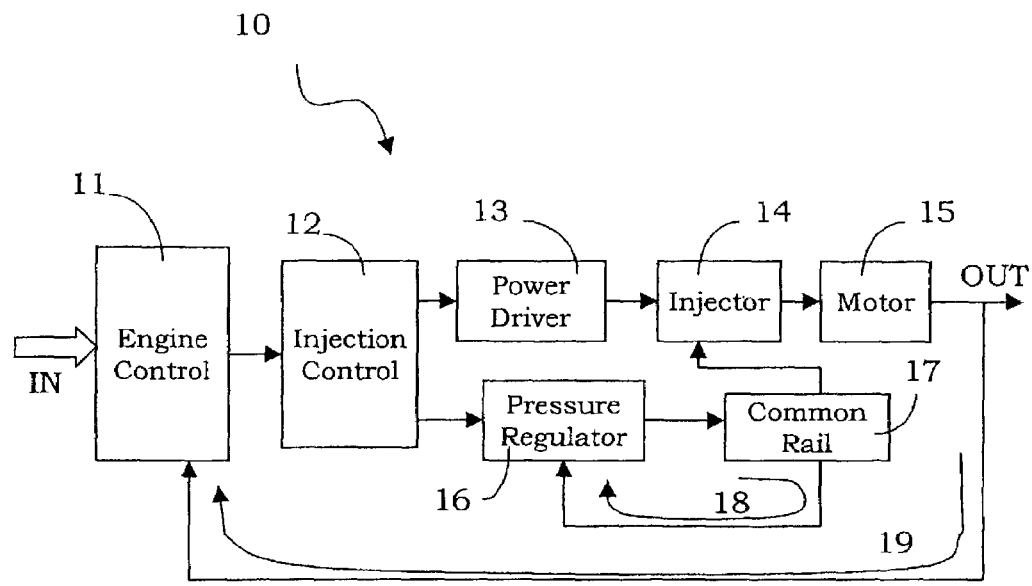
FIG. 7 shows a general engine control layout.

An injection control system based on the above injection control method has been realized for incorporation in the general control layout 10 of a Diesel engine equipped with a common rail (CR) injection system currently available on the market, as it is shown in FIG. 7.

The general control layout 10 includes an input terminal IN, which is connected to an engine control block 11 having its output connected to an injection control block 12. The injection control block 12 has its output connected to a cascade of a power driver 13, an injector block 14, and the engine 15.

The output of the injection control block 12 is further connected to a cascade of a pressure regulator 16 and a Common Rail or CR system 17.

The CR system 17 is connected to the injector block 14 and the pressure regulator 16 to form a first feedback path 18, and the engine 15 is connected to the engine control block 11 to form a second feedback path 19.

In particular, the pressure regulator 16 changes its operational parameters according to pressure information incoming over the first feedback path 18 from the CR system 17, the CR system controlling the injector block 14 in its turn.

Information about the engine, such as RPM and attainment of TDC, is supplied to the engine control block 11 over the second feedback path 19.

As mentioned before, the injection control method any injection forms as injection pressure varies, and allows variation of all the characteristic parameters of injection.

In one embodiment, the invention provides an injection control system having an "open" type of structure, such that certain parameters hitherto regarded as "fixed" in traditional control systems of literature, e.g, the number of injections effected per engine cycle, can now be varied.

This injection control system is, moreover, unaffected by the technical features of the actuators (in the instance of a Diesel engine, they are injectors and a high pressure injection pump) and is appropriate to study and characterize any engines under different conditions and different speeds, so as to optimize their use in any operating ranges from warm-up to top speed.

Figure 8:
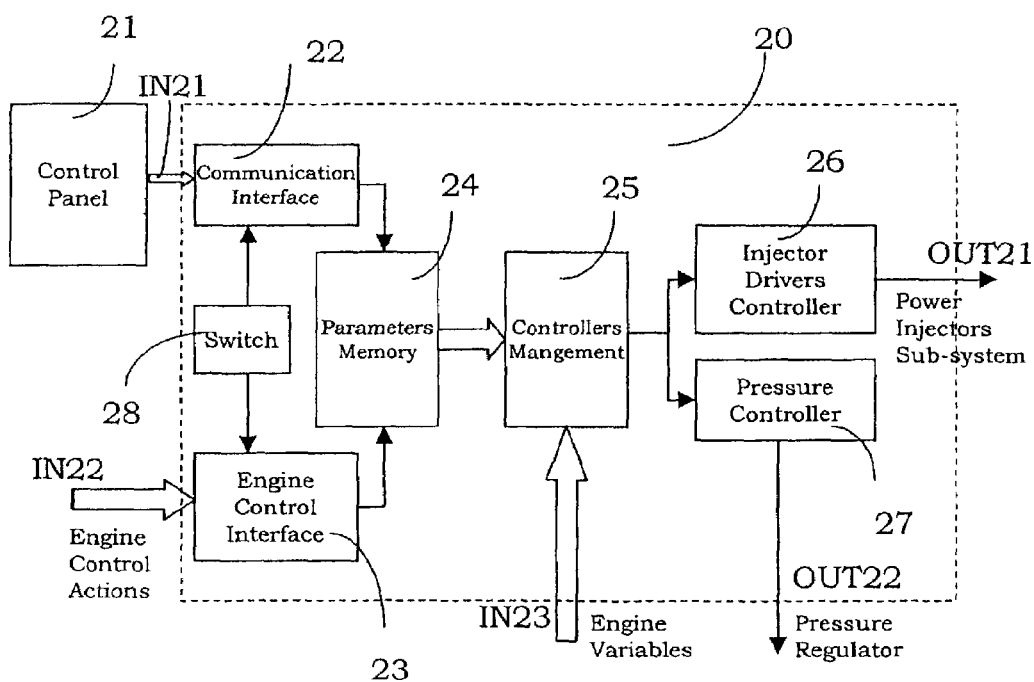
FIG. 8 schematically shows a fuel injection control block according to the invention, for incorporation in the diagram of FIG. 7.

Advantageously, an injection control system 20, schematically shown in FIG. 8, is used instead of the injection control block 12 provided in the general layout 10.

The injection control system 20 is, therefore, fully compatible with the engine control arrangements currently available on the market.

In particular, the injection control system 20 has its input connected to a control panel 21 adapted to receive user's specifications such as the injection profile, pressure references, engine variables, and monitoring signals. The control panel 21 outputs a user's specification coding to a first input terminal IN21 of the injection control system 20.

It should be emphasized that the control panel 21 is essentially a block for laboratory experimentation. In particular, the control panel 21 allows an injection strategy to be set and the corresponding engine response monitored by an operator.

Figure 9:
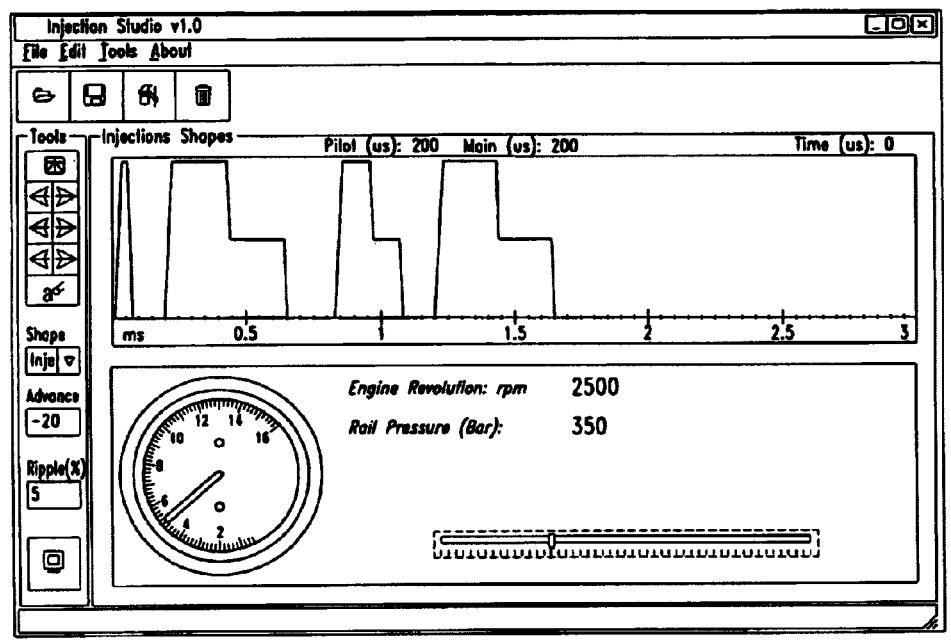
FIG. 9 shows an exemplary interface with the fuel injection control block of FIG. 8.

For experiments of this kind, the control panel 21 is typically provided in the form of a processor and display facilities, as schematically shown in FIG. 9. Known is to use a dedicated software with a display.

In particular, the injection control system 20 comprises a communication interface 22 connected to the first input terminal IN21 to receive the user's specification coding. The communication interface 22 re-processes the codes and outputs address signals, data, and controls concerning the user's specifications to a memory 24.

The communication interface 22 essentially provides a means of transferring into the memory 24 injection profiles that are externally set through the control panel 21.

The injection control system 20 further comprises an engine control interface 23 arranged to receive, on a second input terminal IN22 of the injection control system 20, signals related to the engine control actions from an external unit.

The engine control interface 23 also supplies address signals, data, and controls about the engine control actions, to the memory 24.

Memory 24 is the system memory, and contains all the parameters that are required for implementing specified injection profiles and controlling the pressure in the CR system.

It should be emphasized that the engine control interface 23 enables full integration of the injection control system 20 with engine control systems that are available at present and are in the laboratory stage, so as to provide the necessary flexibility for full utilization of the CR system potential.

In other words, the engine control interface 23 allows the injection control system 20 as a whole to be used as actuator of a complete existing engine control system.

Furthermore, the engine control interface 23 and the communication interface 22 are connected to a switch 28 that controls their exclusive operation such that the injection control system 20 can be operated either as a testing device (the supervised mode) or as a car-fitted device. Particularly in the test mode, the switch 28 turns on the communication interface 22 and turns off the engine control interface 23, while in the car-fitted mode, the switch 28 dually turns off the communication interface 22 and turns on the engine control interface 23.

The memory 24 has its output connected to a controller management block 25 to supply it with injection characterizing data and engine variables. The controller management block 25 receives, on a third input terminal IN23 of the injection control system 20, analog/digital signals from the engine variable-measuring systems, and outputs suitable control signals to a first controller 26 of the injector drivers and pressure control signals to a second controller 27 of the pressure regulator in the CR system.

In other words, the controller management block 25 operates to acquire, from the memory 24, the aforementioned characterizing parameters, and effects a conversion between these specifications and the control actions to be applied, thereby generating suitable signals that are addressed to the controllers 26 and 27 connected to its output.

In particular, the first controller 26 is input the timing specifications of the digital signals actuating the power devices (injectors) and supplies, to a first output terminal OUT21 of the injection control system 20, suitable digital signals actuating an injector power subsystem.

A typical output signal from the first controller 26 is a PWM signal that is generated in connection with the duty cycle and the rate set by the controller management block 25.

Likewise the second controller 27 is input the timing specifications of the digital signals actuating the regulating devices (in particular, valves) and supplies, to a second output terminal OUT22 of the injection control system 20, suitable digital signals actuating the pressure regulator 16 of the CR system.

In other words, the second controller 27 suitably sets the pressure values that have been indicated in defining the injection profile. These values depend on the type of pressure regulator employed in the CR system.

In a preferred embodiment of the injection control system 20, the controller management block 25 generates input signals to the first controller 26 of the injector drivers in terms of setting the duty cycle and frequency of a suitable PWM signal, as dictated by the pattern (shape) set for the injection.

The sequence of operations that are contingent on the controller management block 25 are performed while ensuring their synchronization with the engine variables as suitably processed.

Figure 10:
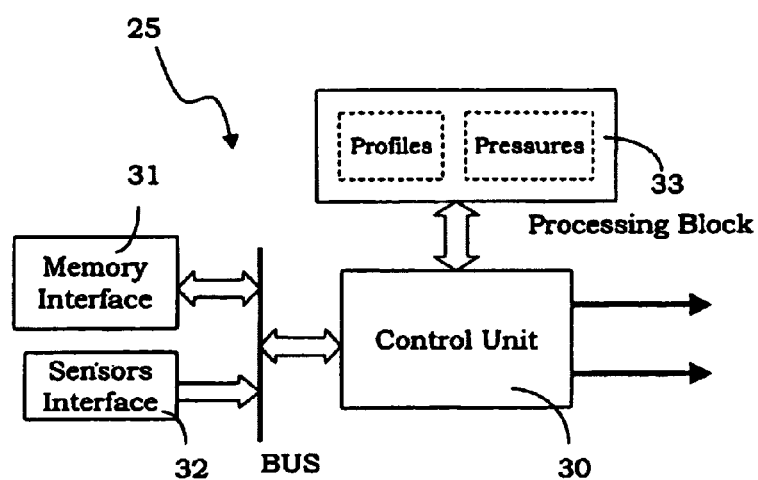
FIG. 10 schematically shows a controller management block for incorporation in the fuel injection control block of FIG. 8.

One embodiment of the controller management block 25 is schematically shown in FIG. 10.

The controller management block 25 comprises a central control unit 30 that is connected, through a bus, to a memory interface 31, a sensor interface 32, and a processing block 33.

The processing block 33 essentially comprises data concerning the injection profiles to be implemented and the pressure values to be maintained in the CR system.

Advantageously according to the invention, the injection control system can be used not only in the supervised mode for thoroughly testing a fuel injection system, but also as an integral part of an engine control system of the kind to be found in a car, since it is perfectly compatible with the systems currently available on the market.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

We claim:

1. An injection control method for controlling a common rail fuel injection system in a diesel engine, the method comprising the following steps:
   an initializing step for acquiring control parameters of said engine;
   a main adjustment cycle that adjusts operational variables of said engine; and
   an interrupting step for adjusting an injection procedure of said injection system, the injection procedure operating on a plurality of characteristic parameters, the interrupting step including varying the characteristic parameters of said injection procedure, wherein said initializing step comprises the following steps:
   starting an initializing procedure;
   checking the control parameters for availability in a feedback loop that repeats said checking step until said control parameters are available;
   upon said control parameters becoming available, reading the control parameters from a communication interface and storing them at appropriate memory locations; and
   interrupting the procedure.

2. The injection control method according to claim 1, wherein said characteristic parameters of said injection procedure include a pressure value in said injection system, a number of injections to be effected in one operating cycle of the engine, values of intervals between injections, a duration of each injection, timing with respect to a Top Dead Centre, an injection profile, amplitude and duration values of peak currents for each injection, amplitude and duration values of hold currents for each injection, and an injection rate per cycle, with no parameters being presumed to be fixed.

3. The injection control method according to claim 1, wherein said main adjustment cycle only adjusts said operational variables, while said injection procedure of said injection system is managed by said interrupting step as synchronized to a pilot signal being active when said engine cycle is synchronized to a reference that is set in terms of lead and/or lag with respect to a top dead centre during a compression phase of said engine.

4. The injection control method according to claim 1, wherein said main adjustment cycle comprises the following steps:
   starting an adjustment procedure;
   acquiring analog and digital characteristic parameters of said engine;
   comparing said analog and digital parameters with said control parameters stored during said initializing step, and defining corresponding adjustment laws for application to said engine;
   applying said adjustment laws and returning to said acquiring step; and
   interrupting the procedure.

5. The injection control method according to claim 4, wherein said main adjustment cycle is only interrupted by a reset signal to the injection control system being generated manually in an emergency situation or due to malfunction.

6. The injection control method according to claim 1, wherein said interrupting step is activated during an engine compression phase and when an engine output shaft reaching a pre-set start angle, and comprises the following steps:
   starting an interrupting procedure;
   reading from said memory control parameters related to said injection procedure;
   setting injection timing and corresponding control signals;
   by means of said control signals, driving power drivers that are able to effect said injections; and
   checking said injection procedure for completion: if said injection procedure is not completed, returning to the read step, otherwise interrupting said interrupting procedure and returning to said main control cycle.

7. An injection control method for controlling a common rail fuel injection system in a diesel engine, the method comprising the following steps:
   an initializing step for acquiring control parameters of said engine;
   a main adjustment cycle that adjusts operational variables of said engine; and
   an interrupting step for adjusting an injection procedure of said injection system, the injection procedure operating on a plurality of characteristic parameters, the interrupting step including varying the characteristic parameters of said injection procedure, wherein said main adjustment cycle comprises the following steps:
   starting an adjustment procedure;
   acquiring analog and digital characteristic parameters of said engine;
   comparing said analog and digital parameters with said control parameters stored during said initializing step, and defining corresponding adjustment laws for application to said engine;
   applying said adjustment laws and returning to said acquiring step; and
   interrupting the procedure.

8. The injection control method according to claim 7, wherein said characteristic parameters of said injection procedure include a pressure value in said injection system, a number of injections to be effected in one operating cycle of the engine, values of intervals between injections, a duration of each injection, timing with respect to a Top Dead Centre, an injection profile, amplitude and duration values of peak currents for each injection, amplitude and duration values of hold currents for each injection, and an injection rate per cycle, with no parameters being presumed to be fixed.

9. The injection control method according to claim 7, wherein said main adjustment cycle only adjusts said operational variables, while said injection procedure of said injection system is managed by said interrupting step as synchronized to a pilot signal being active when said engine cycle is synchronized to a reference that is set in terms of lead and/or lag with respect to a top dead centre during a compression phase of said engine.

10. The injection control method according to claim 7, wherein said main adjustment cycle is only interrupted by a reset signal to the injection control system being generated manually in an emergency situation or due to malfunction.

11. The injection control method according to claim 7, wherein said interrupting step is activated during an engine compression phase and when an engine output shaft reaching a pre-set start angle, and comprises the following steps:
   starting an interrupting procedure;
   reading from said memory control parameters related to said injection procedure;
   setting injection timing and corresponding control signals;
   by means of said control signals, driving power drivers that are able to effect said injections; and
   checking said injection procedure for completion: if said injection procedure is not completed, returning to the read step, otherwise interrupting said interrupting procedure and returning to said main control cycle.

12. An injection control method for controlling a common rail fuel injection system in a diesel engine, the method comprising the following steps:

an initializing step for acquiring control parameters of said engine;

a main adjustment cycle that adjusts operational variables of said engine; and an interrupting step for adjusting an injection procedure of said injection system, the injection procedure operating on a plurality of characteristic parameters, the interrupting step including varying the characteristic parameters of said injection procedure, wherein said interrupting step is activated during an engine compression phase and when an engine output shaft reaching a pre-set start angle, and comprises the following steps:

starting an interrupting procedure;

reading from said memory control parameters related to said injection procedure;

setting injection timing and corresponding control signals;

by means of said control signals, driving power drivers that are able to effect said injections; and checking said injection procedure for completion: if said injection procedure is not completed, returning to the read step, otherwise interrupting said interrupting procedure and returning to said main control cycle.

13. The injection control method according to claim 12, wherein said characteristic parameters of said injection procedure include a pressure value in said injection system, a number of injections to be effected in one operating cycle of the engine, values of intervals between injections, a duration of each injection, timing with respect to a Top Dead Centre, an injection profile, amplitude and duration values of peak currents for each injection, amplitude and duration values of hold currents for each injection, and an injection rate per cycle, with no parameters being presumed to be fixed.

14. The injection control method according to claim 12, wherein said main adjustment cycle only adjusts said operational variables, while said injection procedure of said injection system is managed by said interrupting step as synchronized to a pilot signal being active when said engine cycle is synchronized to a reference that is set in terms of lead and/or lag with respect to a top dead centre during a compression phase of said engine.

15. The injection control method according to claim 12, wherein said main adjustment cycle comprises the following steps:

starting an adjustment procedure;

acquiring analog and digital characteristic parameters of said engine;

comparing said analog and digital parameters with said control parameters stored during said initializing step, and defining corresponding adjustment laws for application to said engine;

applying said adjustment laws and returning to said acquiring step; and interrupting the procedure, wherein said main adjustment cycle is only interrupted by a reset signal to the injection control system being generated manually in an emergency situation or due to malfunction.

* * * * *

UNITED STATES PATENT AND TRADEMARK OFFICE
CERTIFICATE OF CORRECTION

| | | |
|---|---|---|
| PATENT NO. | : 7,051,714 B2 | Page 1 of 1 |
| APPLICATION NO. | : 10/272478 | |
| DATED | : May 30, 2006 | |
| INVENTOR(S) | : Manuela La Rosa et al. | |

It is certified that error appears in the above-identified patent and that said Letters Patent is hereby corrected as shown below:

Title Page
Item (75) Inventors, city of second named inventor listed as "Marigaliano" should read --Marigliano--.

Signed and Sealed this

First Day of May, 2007

JON W. DUDAS
*Director of the United States Patent and Trademark Office*